(12) United States Patent
Borchert et al.

(10) Patent No.: US 11,858,323 B2
(45) Date of Patent: Jan. 2, 2024

(54) CONVERTIBLE TOP ELEMENT AND CONVERTIBLE TOP FOR A CONVERTIBLE VEHICLE AND CONVERTIBLE VEHICLE

(71) Applicant: Bayerische Motoren Werke Aktiengesellschaft, Munich (DE)

(72) Inventors: Steffen Borchert, Berg (DE); Peter Holler, Landsberg (DE); Ralf Mehling, Munich (DE); Thomas Schnaufer, Oberhausen (DE); Daniel Seiboth, Odelzhausen (DE); Christian Spickermann, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 804 days.

(21) Appl. No.: 16/971,939

(22) PCT Filed: Feb. 5, 2019

(86) PCT No.: PCT/EP2019/052688
§ 371 (c)(1),
(2) Date: Aug. 21, 2020

(87) PCT Pub. No.: WO2019/162075
PCT Pub. Date: Aug. 29, 2019

(65) Prior Publication Data
US 2021/0086599 A1    Mar. 25, 2021

(30) Foreign Application Priority Data
Feb. 23, 2018   (DE) ..................... 10 2018 202 771.4

(51) Int. Cl.
*B60J 7/12*     (2006.01)
*B32B 3/12*     (2006.01)
(Continued)

(52) U.S. Cl.
CPC ............... *B60J 7/1226* (2013.01); *B32B 3/12* (2013.01); *B60J 7/1265* (2013.01); *B32B 15/046* (2013.01);
(Continued)

(58) Field of Classification Search
CPC   B60J 7/12; B60J 7/1226; B32B 5/022; B32B 5/18; B32B 5/245; B32B 5/26;
(Continued)

(56) References Cited

U.S. PATENT DOCUMENTS 5,733,620 A  *  3/1998  Baader ................... B60J 7/1226
                                                     428/605
6,871,898 B2 *  3/2005  Jarrard ................... B60J 7/1226
                                                    296/107.01
(Continued)

FOREIGN PATENT DOCUMENTS

CN          203318306 U     12/2013
CN          103648814 A      3/2014
(Continued)

OTHER PUBLICATIONS

English translation of Chinese Office Action issued in Chinese Application No. 201980013116.X dated Nov. 19, 2021 (11 pages).
(Continued)

*Primary Examiner* — Jason S Daniels
(74) *Attorney, Agent, or Firm* — Crowell & Moring LLP

(57) ABSTRACT

A convertible top element for a convertible vehicle has, in sequence: an outer cover layer, a coupling layer, a convertible top bow, an absorber layer and an inner cover layer.

23 Claims, 1 Drawing Sheet

(51) Int. Cl.
    *B32B 15/04*     (2006.01)
    *B32B 15/088*    (2006.01)
    *B32B 15/09*     (2006.01)
    *B32B 15/18*     (2006.01)
    *B32B 25/18*     (2006.01)
    *B32B 27/06*     (2006.01)

(52) U.S. Cl.
    CPC ............. *B32B 15/088* (2013.01); *B32B 15/09* (2013.01); *B32B 15/18* (2013.01); *B32B 25/18* (2013.01); *B32B 27/065* (2013.01); *B32B 2605/08* (2013.01)

(58) Field of Classification Search
    CPC ....... B32B 27/08; B32B 27/12; B32B 27/308; B32B 27/36; B32B 27/40
    USPC ..................................................... 296/107.09
    See application file for complete search history.

(56) References Cited

U.S. PATENT DOCUMENTS

| | | |
|---|---|---|
| 7,147,716 B1 | 12/2006 | Boukobza et al. |
| 2006/0137936 A1 | 6/2006 | Schulze et al. |
| 2014/0159418 A1 | 6/2014 | Kiesewetter et al. |
| 2018/0050580 A1 | 2/2018 | Sviberg et al. |

FOREIGN PATENT DOCUMENTS

| | | | | |
|---|---|---|---|---|
| CN | 105383132 A | 3/2016 | | |
| DE | 199 48 666 A1 | 4/2001 | | |
| DE | 102 51 327 A1 | 5/2004 | | |
| DE | 10 2004 003 788 A1 | 8/2005 | | |
| DE | 10 2004 009 080 A1 | 9/2005 | | |
| DE | 10 2008 064 257 A1 | 6/2010 | | |
| DE | 10 2010 047 857 A1 | 4/2012 | | |
| DE | 10 2011 103 796 A1 | 12/2012 | | |
| DE | 102012011142 A1 * | 12/2013 | ............ | B60J 7/1226 |
| DE | 20 2014 105 490 U1 | 11/2014 | | |
| DE | 20 2014 105 490 U1 | 1/2015 | | |
| DE | 10 2016 115 505 A1 | 2/2018 | | |
| JP | 6702924 B2 * | 6/2020 | ............ | B32B 27/08 |
| WO | WO 2005/075188 A1 | 8/2005 | | |
| WO | WO 2016/142517 A1 | 9/2016 | | |

OTHER PUBLICATIONS

International Search Report (PCT/ISA/210) issued in PCT Application No. PCT/EP2019/052688 dated Mar. 26, 2019 with English translation (four (4) pages).

German-language Written Opinion (PCT/ISA/237) issued in PCT Application No. PCT/EP2019/052688 dated Mar. 26, 2019 (five (5) pages).

German-language Search Report issued in German Application No. 10 2018 202 771.4 dated Oct. 31, 2018 with partial English translation (12 pages).

* cited by examiner

CONVERTIBLE TOP ELEMENT AND CONVERTIBLE TOP FOR A CONVERTIBLE VEHICLE AND CONVERTIBLE VEHICLE

BACKGROUND AND SUMMARY OF THE INVENTION

The present invention relates to a convertible top element and to a convertible top for a convertible vehicle, and to a convertible vehicle which comprises such a convertible top.

In the case of convertible vehicles a distinction is made between substantially two types, i.e. such with classic cloth tops which are erected by means of a frame assembly and a sub-structure, these being so-called soft tops, and metallic folding roofs, so-called hard tops, which are composed of metal elements which are deposited in the rear region when the convertible top is opened.

There are differences in acoustic terms between fabric convertible tops and metallic folding roofs. While the external shape of the erected fabric convertible tops is determined by the convertible top frame assembly to the extent that the supporting structure is visibly evident in the erected external skin, this not being completely avoidable and in most instances not corresponding to an aerodynamic shape, there are many degrees of freedom in terms of shaping the sheet-metal external skin in the case of the hard top. Apart from the aerodynamically optimal geometry of the hard top, the mechanical strength of the roof segments in the folding roof is advantageous, this aiding in largely avoiding any wind noise. In comparison to the latter, the textile convertible top covers in terms of the prevailing pressure conditions resulting from the laminar flow on the vehicle body in driving operation are more compliant, this in turn purportedly not leading to annoying acoustics on account of the air.

In soft tops it is disadvantageous that the latter by virtue of the low inherent weight often do not offer sufficient acoustic damping. The noises entering through the roof region are clearly more perceptible in comparison to hard tops. Hard tops offer a high level in terms of perceived encapsulation in the convertible vehicle, but do have a high inherent weight and, by virtue of the surface of the hard tops which on the side facing the vehicle interior is not very absorbent, can handle and absorb noise in the convertible vehicle only to a limited extent. Only noise at a very high frequency can be absorbed by virtue of the minor absorbent proportion by way of the hard top interior trim. Noise from the main sources such as, for example, tire noise, is largely reflected in the acoustic near-field region of the vehicle occupant, this leading to a low level of acoustic comfort.

Apart from the above-mentioned types of convertible tops for convertible vehicles, there is furthermore a hybrid form of soft tops and hard tops in which a convertible top fabric is applied so as to be stretched over planar elements, so-called planar bows. On account thereof, the convertible top fabric at a reduced inherent weight in comparison to the hard tops can be positively applied and stretched such that the convertible top fabric stabilizes the convertible top in relation to the engaging forces of the airstream also when travelling in the closed convertible vehicle.

DE 19948666 A1 describes a passenger motor vehicle having a convertible top which can be lowered into a convertible top compartment and which on the external side has a textile covering, wherein reinforcement plates which can be moved relative to one another when opening and closing the convertible top and which in the closed state of the convertible top bear tightly on one another in such a manner that the noise from the environment introduced through the roof face is effectively damped are provided on the side of the textile covering that faces the vehicle interior. However, an acoustic damping which is provided in this form cannot adequately absorb noise in the near field of the occupants so that the overall wind noise acting on the vehicle still remains very high.

Proceeding from this prior art, it is an object of the present invention to provide a first convertible top element as well as a convertible top for a convertible vehicle which by virtue of improved acoustic damping and enhanced absorption of noise enable a high level of acoustic comfort. Moreover, it is an object of the invention to provide a convertible vehicle having a very high level of acoustic comfort.

The object is achieved by a first convertible top element for a convertible vehicle which has a multi-layered construction and comprises at least the following layers in the stated sequence: an external convertible top tier, a coupling layer, a planar bow, an absorbent layer, and an internal convertible top tier.

The external convertible top tier herein represents the tier which in the installed state of the first convertible top element in a convertible vehicle is in contact with the environment of the convertible vehicle. The external convertible top tier is therefore in particular an at least water-repellent, preferably a water-tight, covering which repels weather influences and by virtue of an improved vibration behavior acts in a noise-damping manner.

This acoustic damping is improved by providing the coupling layer. The coupling layer in terms of the details thereof is not limited and contributes toward improving the visual appearance of the first convertible top element in that the visual evidence of layers below the coupling layer is avoided on account of the provision of the coupling layer and an ideally uniform and uninterrupted planar external convertible top tier is thus achieved.

The planar bow is a planar support structure which erects the first convertible top element and supports the latter in the expanded state. The planar bow thus serves in particular in providing a mechanical rigidity and load-bearing capability of the first convertible top element, and by virtue of the planar extent thereof significantly improves the acoustic damping.

The absorbent layer is preferably distinguished by enhanced noise-absorbing properties. The absorbent layer in the installed state of the first convertible top element in a convertible top for a convertible vehicle faces an interior of the vehicle. Absorbent properties for absorbing noise from the interior of the vehicle are therefore of particular importance.

The internal convertible top tier, the so-called headlining, in the installed state of the first convertible top element in a convertible vehicle forms the tier of the first convertible top element that is in contact with the vehicle interior and also represents a visible face. The internal convertible top tier is thus in particular characterized by a visually appealing look and furthermore has flow-optimized properties so that noise from the vehicle interior can be transmitted to the noise-absorbent absorbent layer. The internal convertible top tier is thus permeable to sound and does not act as a barrier layer on which acoustic waves would be reflected.

The individual tiers of the first convertible top element according to the invention do not in each case have to completely overlap one another. Rather, it is possible that individual tiers in terms of the planar extent thereof are configured so as to be smaller or larger, or project from other tiers or are recessed in relation to the latter. However, all tiers of the first convertible top element may substantially largely overlap one another. Particular preferably, the fabric-type tiers of the first convertible top element project from the planar bow, for example so as to span the entire roof in the installed state of the first convertible top element in a convertible vehicle, wherein planar bows provided for erecting are envisaged only in portions.

Further tiers can complete the first convertible top element. However, the tiers set forth above for the first convertible top element according to the invention preferably define completely the first convertible top element, as a maximum functionality with a view to optimizing the aero-acoustics of the first convertible top element can thus be achieved at a minimum layered construction and thus at ideally low costs.

The first convertible top element according to the invention by virtue of the structural and functional construction thereof is distinguished by highly noise-damping and also very positive noise-absorbing properties such that consequently an optimum level of acoustic comfort can be provided by the first convertible top element at a low inherent weight in comparison to conventional hard tops from steel.

The dependent claims relate to advantageous refinements and design embodiments of the invention.

According to one advantageous refinement, the external convertible top tier has an area weight in a range from 1000 to 1500 g/m2, and in particular in a range from 1100 to 1300 g/m$^2$. On account thereof, the insertion loss of the external convertible top tier can be increased, particularly in high frequency ranges. Alternatively or additionally, a layer thickness of the external convertible top tier is 0.8 to 2 mm, and in particular 1 to 1.5 mm. A layer thickness in the range from 1 to 1.5 mm has proven particularly advantageous in terms of a very positive shaping capability and a high level of acoustic damping, in particular when the area weight of the external convertible top tier is approximately 1200 g/m$^2$.

Unless otherwise stated, the layer thickness according to the invention is measured in the stacking direction of the individual tiers of the first convertible top element.

One further advantageous refinement provides that the external convertible top tier comprises a plastics material layer. The plastics material layer in terms of the details thereof is not limited and can in particular be an acrylic layer, a butyl rubber layer, a polyethylene terephthalate layer, or any arbitrary combination of the layers.

In order for there not to be any structures of the underlying layers visibly evident in the external convertible top tier, and in order for the noise-damping properties of the first convertible top element to be further improved, the coupling layer has a layer thickness of 4 to 8 mm, in particular of 5.5 to 6.5 mm. Specifically with a view to damping noise in the high-frequency range, non-wovens from plastics material fibers which are selected from polyester, polyether sulfone, polyacrylate, polyamide, and mixtures therefrom, have proven particularly advantageous.

A non-woven in the context of the present invention is understood to be a planar structure from fibers which are loosely intermingled but are not connected to one another. The strength of the non-woven is based only on the fiber-inherent adhesion.

The coupling layer furthermore advantageously has an area weight of 130 to 270 g/m$^2$, in particular of 180 to 220 g/m$^2$.

The planar bow of the first convertible top element according to the invention which serves for erecting the remaining tiers of the convertible top element can be formed from a metallic basic material such as steel, for example, and be present in the form of a steel-sheet component. This is advantageous when a particularly high level of acoustic damping is to be achieved. Deep-drawn metal-sheet components, die-cast aluminum components, or die-cast magnesium components have proven advantageous as an alternative to steel-sheet components by virtue of the reduced inherent weight and a nevertheless very high rigidity.

Honeycomb sandwich structures are particularly advantageous as planar bows since the honeycomb sandwich structures have a high mechanical rigidity at a minimized inherent weight. A honeycomb sandwich structure is understood to be a double-layered or multi-layered arrangement of dissimilar layers of which at least one is configured in the form of honeycombs. It has been demonstrated that a honeycomb structure has an insertion loss which is favorable in terms of the invention.

With a view to an embodiment which is ideally reduced in terms of weight and has a very positive mechanical rigidity it is furthermore provided that a layer thickness of the steel-sheet component is 0.7 to 1 mm, a layer thickness of the deep-drawn metal-sheet component is 1.2 to 3 mm, a layer thickness of the die-cast aluminum component is 1.2 to 3 mm, a layer thickness of the die-cast magnesium component is 2.5 to 4 mm, and a layer thickness of the honeycomb sandwich structure is 7 to 10 mm.

In terms of a further improvement of the noise-damping properties of the first convertible top element while optimizing the planar erection of the tiered structure it is furthermore advantageously provided that the honeycomb sandwich structure as a central layer comprises a paper honeycomb structure and as respective external layers that surround the central layer comprises fiber/plastics material composite layers such as, for example, carbon fiber/plastics materials composites (CFRP), and/or plastics material layers and/or light metal layers. The paper honeycomb structure which is also referred to as a paper honeycomb (PHC), by virtue of the fiber structure has a very high damping capability in relation to noise of various frequency ranges and moreover has noise-absorbing properties.

Light metal layers which are formed in particular by means of formed metal sheets or casting elements, are distinguished by a very low inherent weight as well as by a very high mechanical rigidity. A particularly suitable light metal is aluminum which in the form of aluminum layers can surround a central honeycomb structure layer. To this end, the aluminum layer is in particular provided with an adhesive layer which can establish a positive bond with the central honeycomb structure layer. Particularly suitable adhesive layers herein are butyl rubber layers. The latter are self-adhesive and laminate the aluminum surface very well.

The honeycomb sandwich structure, in particular when light metal layers are used as external cover layers that surround a central honeycomb structure layer, has an area weight of 1000 to 6000 g/m$^2$, in particular of 1500 to 5500 g/m$^2$.

The planar bow preferably has an area weight of 1 to 9 kg/m$^2$, in particular of 2.5 to 4.5 kg/m$^2$.

The absorbent layer furthermore preferably has a layer thickness of 8 to 15 mm, in particular of 10 to 13 mm, and in particular of 11.5 to 12.5 mm, on account of which the noise-absorbing properties of the absorbent layer can be improved. Alternatively or additionally, it is advantageous when the absorbent layer has an area weight in a range from 300 to 600 g/m$^2$, and in particular from 400 to 500 g/m$^2$. If the area weight is between 300 and 600 g/m$^2$, the degree of the absorption in the high-frequency range is enhanced and sound can be very well absorbed. Alternatively or additionally, it is advantageous when the absorbent layer comprises a foam layer, a perforated absorbent layer, a slotted absorbent layer, or a layer containing plastics material fibers, and combinations thereof, wherein the plastics material fibers are in particular selected from polyester, polyurethane, polypropylene, polyether sulfone, polyacrylate, polyamide, and mixtures thereof. The absorbent can moreover be embodied as a multi-layered absorbent, as a so-called multi-layered absorber, and comprise various combinations of layers.

Foam layers herein are particularly suitable for damping and absorbing sound.

A perforated absorbent and a slotted absorbent differ mainly in terms of the shaping of the openings for absorbing sound. The absorbent layers are advantageously formed from plastics material which has corresponding openings. Polypropylene is well suited as a plastics material.

If the absorbent layer is configured as a layer containing plastics material fibers, the absorbent layer comprises plastics material fibers which are preferably selected from polyester, polyurethane, polypropylene, polyether sulfone, polyacrylate, polyamide, and mixtures thereof, since the plastics material fibers are distinguished by a very positive and dense non-woven formation with a high density such that an area weight in the range from 300 to 600 g/m$^2$ is very readily achievable.

The internal convertible top tier is particularly advantageously configured so as to be open-cell so that sound is not reflected. Open-cell foam plastics materials are in particular preferable among open-cell convertible top tiers, and the internal convertible top tier herein particularly preferably comprises an open-cell polyurethane foam or a polymethacrylimide foam.

The internal convertible top tier can moreover comprise a decorative tier which in this instance is provided as a visible tier.

The absorbent layer is particularly advantageously a foam layer which is applied directly to the planar bow. As has already been set forth above, the foam layer is distinguished by a particularly high level of sound-absorbing functionality. In order for the production of the first convertible top tier element according to the invention to be simplified, the foam layer can be molded or foamed, respectively, on the planar bow and in this instance is connected to the planar bow at least in a materially integral manner.

With a view to a simplified production of the first convertible top element, the planar bow, the absorbent layer, and the internal convertible top tier are furthermore advantageously connected to one another and embodied as one component.

The following advantageous embodiments herein are particularly advantageous.

According to one embodiment, the planar bow is configured as a PHC honeycomb structure having a component thickness of 7 to 10 mm. The component thickness herein comprises no integrally molded ribs, peripheral regions, and linking points of kinematic levers. An absorbent layer in the form of a foam, and here in particular a polyurethane foam, is molded directly on the planar bow, and the internal convertible top tier in the form of an open-cell decorative tier is connected to the foam, wherein the internal convertible top tier has in particular a layer thickness of 1 to 2 mm.

The internal convertible top tier herein is particularly advantageously permeable to sound.

According to one further embodiment, the planar bow is embodied as a deep-drawn metal-sheet component having a layer thickness of 0.7 to 20 mm, or as a die-cast component having a layer thickness of 2 to 5 mm, or as a PHC honeycomb and sandwich structure having a layer thickness of 7 to 10 mm, wherein a multi-layer absorbent having a layer thickness of 2.5 to 3.5 mm and an area weight of 1750 g/m2 to 1850 g/m2 is connected to the planar bow, and an open-cell internal convertible top tier having a layer thickness of 1 to 3 mm is connected to the multi-layer absorbent.

According to one further advantageous embodiment, the planar bow is embodied as a deep-drawn metal-sheet component having a layer thickness of 0.7 to 2 mm, or as a die-cast component having a layer thickness of 2 to 5 mm, or as a honeycomb structure having a layer thickness of 4 to 6 mm, or as a PHC honeycomb structure having a layer thickness of 7 to 10 mm, wherein a perforated absorbent having a layer thickness of 1.5 to 3 mm and a perforation diameter of 1 to 4 mm is connected to the planar bow, and an open-cell internal convertible top tier having a layer thickness of 1 to 3 mm is connected to the perforated absorbent.

According to one further advantageous embodiment, the planar bow is embodied as a deep-drawn metal-sheet component having a layer thickness of 0.7 to 2 mm, or as a die-cast component having a layer thickness of 2 to 5 mm, or as a honeycomb structure having a layer thickness of 4 to 6 mm, or as a PHC honeycomb structure having a layer thickness of 7 to 10 mm, wherein a slotted absorbent having a layer thickness of 1.5 to 3 mm and a slot width of 1 to 4 mm is connected to the planar bow, and an open-cell internal convertible top tier having a layer thickness of 1 to 3 mm is connected to the perforated absorbent. A slot width herein is understood to be the widest opening of the slot.

Likewise according to the invention, a convertible top for a convertible vehicle which comprises at least one first convertible top element as described above is also described. A very positive damping of noise and absorption of noise at a simultaneously low inherent weight of the convertible top can be achieved by using the first convertible top element according to the invention.

In terms of the definition set forth for the convertible top according to the invention, reference is additionally made to the explanations pertaining to the first convertible top element according to the invention. Furthermore, the advantages, advantageous effects, and refinements described in the context of the first convertible top element according to the invention can also be applied to the convertible top according to the invention.

The convertible top according to the invention can comprise one or a plurality of first convertible top elements according to the invention. It is in particular the case herein that the fabric-type tiers of the first convertible top elements are configured in a planar and continuous manner so as to cover and span the entire convertible top of a convertible vehicle, while the planar bow or planar bows is/are disposed as separate planar components between the remaining tiers of the first convertible top elements so as to erect the fabric-type tiers of the first convertible top elements.

Depending on the configuration of the convertible top in terms of the convertible vehicle, one or a plurality of second convertible top elements can be provided additionally to the one or the plurality of first convertible top elements, the second convertible top elements forming joints between the individual first convertible top elements or forming connections between the first convertible top element or first convertible top elements and the body of the convertible vehicle. The second convertible top elements can be advantageously used when a spacing to be bridged is more than 25 mm.

The second convertible top element to be used herein advantageously comprises in this sequence: an external convertible top tier, a foamed plastics material, in particular an open-cell foamed plastics material, in particular from open-cell polyurethane or polymethacrylimide, an absorbent layer, and an internal convertible top tier. The external convertible top tier, the absorbent layer, and the internal convertible top tier herein are configured as has been described above in the context of the first convertible top element according to the invention such that the second convertible top element is likewise distinguished by a high level of noise damping and a high level of noise absorption. The open-cell foamed plastics material herein, even more than the internal cover tier, is configured for achieving absorption of noise.

In one advantageous embodiment of the convertible top, the foamed plastics material has a layer thickness of 3 to 18 mm, in particular of 8 to 11 mm, and/or at a density of 130 kg/m³ has an area weight of 390 to 2340 g/m², in particular of 1040 to 1430 g/m². The layer thickness and the area weight are thus very high, on account of which a particularly high level of noise damping and also noise absorption can be achieved. This structural construction is particularly suitable for second convertible top elements which are linked to body components which are particularly highly exposed to the airstream such as, for example, a region between the convertible top and the lateral body frame, or else between the individual first convertible top elements. The second convertible top element is in particular suitable for the C-pillar of a vehicle, or for lateral, rear and front structures beside the first convertible top elements.

Furthermore according to the invention, a convertible vehicle which is in particular configured as a convertible motor vehicle and which comprises a convertible top as has been disclosed above is also described. The convertible vehicle, by virtue of the use of the convertible top according to the invention, is distinguished by optimized aero-acoustics by virtue of a very positive absorption of sound in the interior of the convertible vehicle such that an optimized aero-acoustic level is achieved in the interior of the convertible vehicle. The level of noise comfort of the convertible vehicle according to the invention is thus optimal by virtue of the very positive passive acoustics.

At least one first convertible top element of the convertible vehicle preferably comprises a transparent glass, in particular a rear glass, of the convertible vehicle, so that the convertible vehicle also enables good circumferential visibility.

Further details, features, and advantages of the invention are derived from the description hereunder and from the figures.

DETAILED DESCRIPTION OF THE DRAWINGS

Only those elements of the first convertible top element according to the invention and of the convertible top that are relevant to the invention are illustrated in the figures. All other elements have been omitted for the sake of clarity. Furthermore, the same reference signs refer to identical elements.

Figure 1:
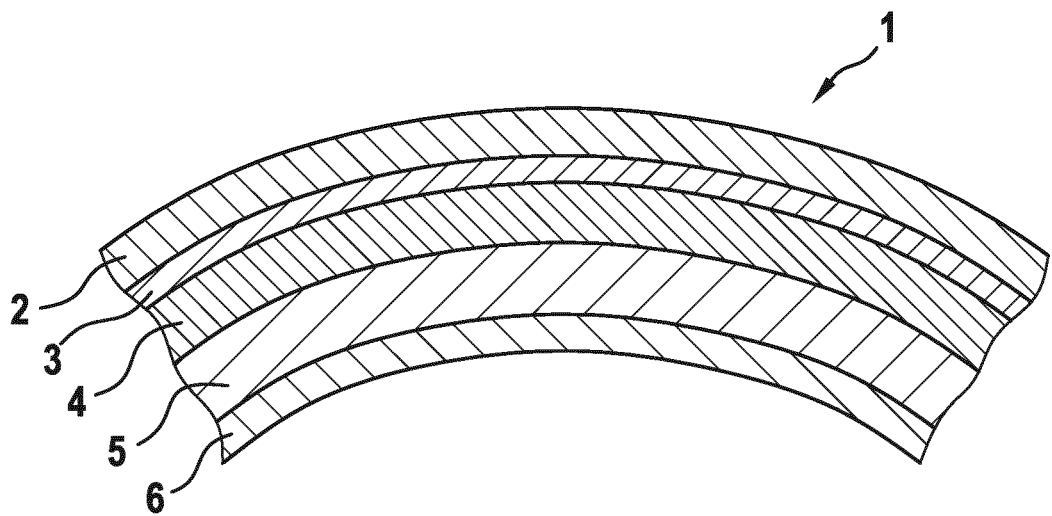
FIG. 1 is a schematic sectional view of a layered construction of a first convertible top element for a convertible vehicle according to one embodiment of the invention.

FIG. 1 shows in detail a first convertible top element 1 for a convertible vehicle and in particular the tiered construction of the first convertible top element 1, or the arrangement of the tiers, respectively, in a sectional view.

The first convertible top element 1 has an external convertible top tier 2 which is configured so as to be water-tight and has an area weight of 1100 to 1300 g/m², in particular of 1450 g/m², and a layer thickness of 1 to 1.5 mm. The external convertible top tier 2 is in particular a laminate which comprises a butyl rubber layer which on both sides is surrounded by two acrylate layers. The external convertible top tier 2 forms the outermost layer of the first convertible top element which in the installed state in a convertible top for a convertible vehicle comes into contact with the environment of the convertible vehicle.

A tier of a coupling layer 3 adjoins the external convertible top tier 2. The coupling layer 3 has a layer thickness of 4 to 8 mm and either is configured as a foam layer (in particular polyurethane foam) or comprises plastics material fibers from polyester, polyether sulfone, polyacrylate, polyamide, and mixtures thereof.

Reference sign 4 represents a planar bow. The planar bow 4 serves for erecting and stabilizing the first convertible top element 1, thus in particular the fabric-type tiers of the first convertible top element 1. The planar bow 4 also significantly contributes towards damping noise by the first convertible top element 1 and is present in the form of a honeycomb sandwich structure which as a central layer comprises a paper honeycomb structure and as respective external layers that surround the central layer comprises fiber/plastics material composite layers and/or plastics material layers and/or light metal layers, in particular aluminum layers having adhesive layers, in particular butyl rubber layers.

The first convertible top element 1 furthermore comprises an absorbent layer 5. The absorbent layer 5 has in particular a layer thickness of 11.5 to 12.5 mm, and an area weight in a range from 400 to 500 g/m², so that a very positive absorption of noise is achieved, in particular in the high-frequency range.

The absorbent layer comprises in particular a foam layer, a perforated absorbent layer, a slotted absorbent layer, or a layer containing plastic material fibres, and combinations thereof, wherein the plastics material fibres are in particular selected from polyester, polyurethane, polypropylene, polyether sulfone, polyacrylate, polyamide, and mixtures thereof.

An internal convertible top tier 6 is furthermore disposed below the absorbent layer 5. The internal convertible top tier 6 in the installed state of the first convertible top element 1 in a convertible vehicle faces the interior of the convertible vehicle and is in particular visible in the interior. The internal convertible top tier 6 comprises in particular an open-cell foamed plastics material which comprises polyurethane or polymethacrylimide. On account thereof, the high requirements set for a visually appealing vehicle headlining as well as the functional requirements in terms of avoiding any reflection of sound can be met.

The planar bow 4, the absorbent layer 5, and the internal convertible top tier 1 are disposed in a tiered manner on top of one another to the extent that they are connected to one another and are in particular embodied as one component.

A first convertible top element is obtained by the tiered arrangement and design embodiment of the individual tiers that form the first convertible top element 1, the latter being distinguished by very positive noise-damping as well as noise-absorbing properties.

Figure 2:
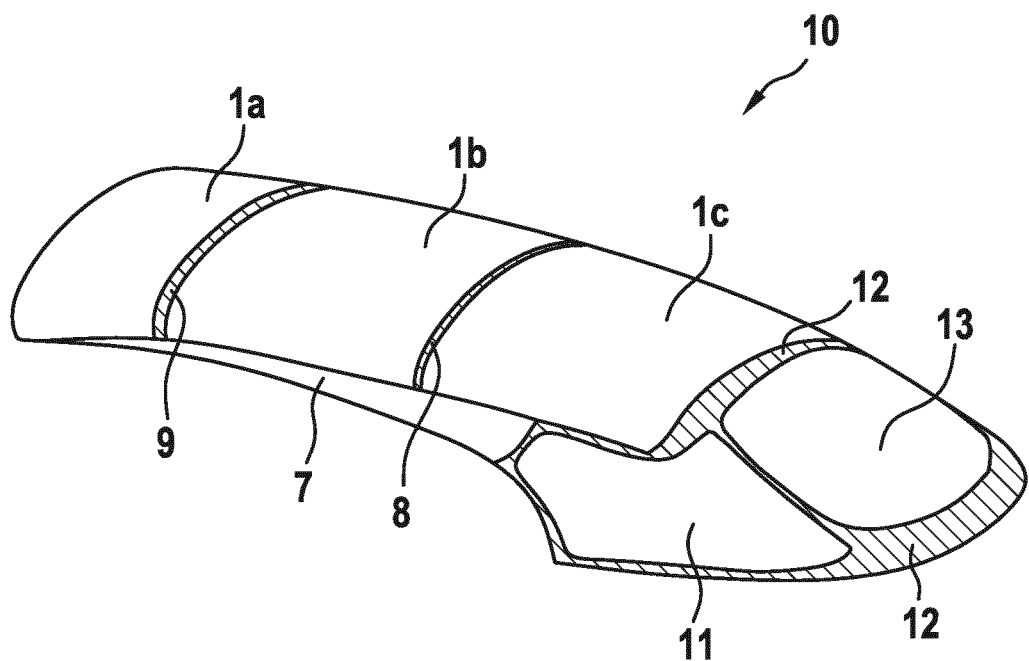
FIG. 2 shows a convertible top for a convertible vehicle according to one embodiment of the invention.

FIG. 2 shows a convertible top 10 for a convertible vehicle. The convertible top 10 comprises three first convertible top elements 1a, 1b, and 1c which can in each case be configured like the first convertible top element 1 illustrated in FIG. 1. The first convertible top element 1a herein points in the direction of the front of the convertible vehicle, while the first convertible top element 1c points in the direction of the rear of the convertible vehicle.

The first convertible top elements 1a, 1b, and 1c are connected to one another by way of convertible top element joints 8, 9.

The convertible top element joints 8, 9 and the laterally disposed second convertible top element 7, wherein the convertible top element joints 8, 9 may likewise be referred to as second convertible top elements 7, are likewise distinguished by a multi-tier layered structure or tiered structure which in sequence comprises an external convertible top tier, an open-cell foamed plastics material, in particular from open-cell polyurethane or polymethacrylimide, an absorbent layer, and an internal convertible top tier, wherein the external convertible top tier, the absorbent layer, and the internal convertible top tier are configured as has been illustrated above in the context of the first convertible top element 1 from FIG. 1. The foamed plastics material has a layer thickness of 8 to 11 mm and at a density of 130 kg/m³ an area weight of 1040 to 1430 g/m², and thus damps the wind noise which acts on the convertible vehicle from the outside and simultaneously absorbs the noise which is present in the interior of the convertible vehicle. The lateral second convertible top element 7 and the convertible top element joints 8 and 9 by virtue of the relatively thick layer thickness and the high area weight of the individual tiers are conceived so as to optimize the wind noise.

The convertible top 10 furthermore comprises a rear second convertible top element 11 and rear sealing joints 12 which are disposed about the rear second convertible top element 11 and the furthermore provided transparent glass 13 from toughened glass. The rear sealing joints 12, by virtue of the structural tiered construction thereof, may likewise be referred to as a second convertible top element 11. The rear second convertible top element 11 and the rear sealing joints 12 are also constructed in multiple layers or multiple tiers, respectively, wherein the tiered construction corresponds to the tiered construction of the lateral second convertible top element 7. The foamed plastics material has a layer thickness of 8 to 11 mm and at a density of 130 kg/m³ has an area weight of 1040 to 1430 g/m². On account thereof, the rear second convertible top element 11 and the rear sealing joints 12 are sufficiently flexible such that the rear second convertible top element 11 and the rear sealing joints 12 are able to follow the exact contours of the predefined shapes of the convertible top 10 and enable positive acoustic damping.

The convertible top 10, while having a simple structure and a low inherent weight, is distinguished by a high level of noise damping in relation to the noise generated by the laminar flow about the vehicle and by a very positive noise absorption of noises prevalent in the interior of the convertible vehicle and is thus extremely suitable for convertible vehicles with an optimized level of acoustic pressure.

LIST OF REFERENCE SIGNS

1 First convertible top element
1a First convertible top element
1b First convertible top element
1c First convertible top element
2 External convertible top tier
3 Coupling layer
4 Planar bow
5 Absorbent layer
6 Internal convertible top tier
7 Lateral second convertible top element
8 Convertible top element joint
9 Convertible top element joint
10 Convertible top
11 Rear second convertible top element
12 Rear sealing joint
13 Glass

What is claimed is:

1. A first convertible top element for a convertible vehicle, comprising in sequence:
    an external convertible top tier;
    a coupling layer;
    a planar bow;
    an absorbent layer; and
    an internal convertible top tier;
    wherein the coupling layer has a layer thickness of 4 to 8 mm and an area weight of 130 to 270 g/m2;
    wherein the planar bow is a steel-sheet component, a deep-drawn metal-sheet component, a die-cast aluminum component, a die-cast magnesium component, or a honeycomb sandwich structure; and
    wherein the absorbent layer has a layer thickness of 8 to 15 mm and an area weight in a range from 300 to 600 g/m2.

2. The first convertible top element according to claim 1, wherein at least one of:
    the external convertible top tier has an area weight in a range from 1000 to 1500 g/m2, and a layer thickness of 0.8 to 2 mm.

3. The first convertible top element according to claim 2, wherein
    the area weight is in a range from 1100 to 1300 g/m2, and the layer thickness is 1 to 1.5 mm.

4. The first convertible top element according to claim 1, wherein
    the external convertible top tier comprises a plastics material layer.

5. The first convertible top element according to claim 4, wherein
    the plastics material layer is one of: an acrylic layer, a butyl rubber layer, a polyethylene terephthalate layer, and arbitrary combinations thereof.

6. The first convertible top element according to claim 1, wherein at least one of:
    the coupling layer has a layer thickness of 5.5 to 6.5 mm,
    the coupling layer comprises a foam layer,
    the coupling layer comprises plastics material fibers which are selected from polyester, polyether sulfone, polyacrylate, polyamide, and mixtures thereof, and
    the coupling layer has an area weight of 180 to 220 g/m2.

7. The first convertible top element according to claim 1, wherein
    a layer thickness of the steel-sheet component is 0.7 to 1 mm,
    a layer thickness of the deep-drawn sheet-metal component is 1.2 to 3 mm,
    a layer thickness of the die-cast aluminum component is 1.2 to 3 mm,
    a layer thickness of the die-cast magnesium component is 2.5 to 4 mm, a component thickness of the honeycomb sandwich structure is 7 to 10 mm;

the honeycomb sandwich structure as a central layer comprises a paper honeycomb structure and as respective external layers that surround the central layer comprises at least one of: fiber/plastics material composite layers, plastics material layers, light metal layers, or the honeycomb sandwich structure has an area weight of 1000 to 6000 g/m2.

8. The first convertible top element according to claim 7, wherein the light metal layers are aluminum layers having adhesive layers.

9. The first convertible top element according to claim 1, wherein at least one of:

the absorbent layer has a layer thickness of 10 to 13 mm, the absorbent layer has an area weight in a range from 400 to 500 g/m2, and the absorbent layer comprises a foam layer, a perforated absorbent upper layer, a slotted absorbent upper layer, or a layer containing plastics material fibers, and combinations thereof, wherein the plastics material fibers are selected from polyester, polyurethane, polypropylene, polyether sulfone, polyacrylate, polyamide, and mixtures thereof.

10. The first convertible top element according to claim 9, wherein the layer thickness is 11.5 to 12.5 mm.

11. The first convertible top element according to claim 1, wherein the internal convertible top layer is open-cell and comprises an open-cell foamed plastics material.

12. The first convertible top element according to claim 11, wherein the open-cell foamed plastics material is an open-cell polyurethane foam or polymethacrylimide foam.

13. The first convertible top element according to claim 1, wherein the absorbent layer is a foam layer which is applied directly to the planar bow.

14. The first convertible top element according to claim 1, wherein the planar bow, the absorbent layer, and the internal convertible top tier connected to one another are configured as one component.

15. A convertible top for a convertible vehicle, comprising at least one first convertible top element according to claim 1.

16. The convertible top according to claim 15, further comprising a second convertible top element comprising in sequence:

an external convertible top tier;
a foamed plastics material;
an absorbent layer; and
an internal convertible top layer.

17. The convertible top according to claim 16, wherein the external convertible top tier has an area weight in a range from 1000 to 1500 g/m2, and a layer thickness of 0.8 to 2 mm.

18. The convertible top according to claim 17, wherein the external convertible top tier comprises a plastics material layer.

19. The convertible top according to claim 18, wherein the absorbent layer has a layer thickness of 10 to 13 mm, the absorbent layer has an area weight in a range from 400 to 500 g/m2, and the absorbent layer comprises a foam layer, a perforated absorbent upper layer, a slotted absorbent upper layer, or a layer containing plastics material fibers, and combinations thereof, wherein the plastics material fibers are selected from polyester, polyurethane, polypropylene, polyether sulfone, polyacrylate, polyamide, and mixtures thereof.

20. The convertible top according to claim 19, wherein the internal convertible top layer is open-cell and comprises an open-cell foamed plastics material.

21. The convertible top according to claim 16, wherein the foamed plastics material has a layer thickness of 3 to 18 mm, and/or at a density of 130 kg/m3 has an area weight of 390 to 2340 g/m2.

22. A convertible vehicle, comprising the convertible top according to claim 15.

23. The convertible vehicle according to claim 22, wherein at least one first convertible top element comprises a transparent rear glass of the convertible vehicle.

* * * * *